United States Patent
Harutyunyan et al.

(10) Patent No.: US 10,920,085 B2
(45) Date of Patent: Feb. 16, 2021

(54) ALTERATION OF CARBON FIBER SURFACE PROPERTIES VIA GROWING OF CARBON NANOTUBES

(71) Applicant: HONDA MOTOR CO., LTD., Tokyo (JP)

(72) Inventors: Avetik Harutyunyan, Columbus, OH (US); Rahul Rao, Yellow Springs, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/002,032

(22) Filed: Jan. 20, 2016

(65) Prior Publication Data
US 2017/0204271 A1   Jul. 20, 2017

(51) Int. Cl.
C09C 1/44     (2006.01)
C08K 9/02     (2006.01)

(52) U.S. Cl.
CPC .................. C09C 1/44 (2013.01); C08K 9/02 (2013.01); *C01P 2004/01* (2013.01)

(58) Field of Classification Search
CPC .............. C01B 31/022; C01B 31/0226; C01B 31/0223; C23C 16/26; C23C 16/0245; C23C 16/0236; C23C 16/0263; C23C 16/0281; C23C 16/042; C23C 16/0272
USPC ...... 427/533, 535, 551, 249.1, 249.2, 249.3, 427/249.4, 249.6; 977/742
See application file for complete search history.

(56) References Cited

U.S. PATENT DOCUMENTS

| | | |
|---|---|---|
| 6,660,340 B1 | 12/2003 | Kirkpatrick |
| 6,706,402 B2 | 3/2004 | Rueckes et al. |
| 6,919,592 B2 | 7/2005 | Segal et al. |
| 6,924,538 B2 | 8/2005 | Jaiprakash et al. |
| 7,033,647 B2 | 4/2006 | Tang et al. |
| 7,112,464 B2 | 9/2006 | Jaiprakash et al. |
| 7,259,410 B2 | 8/2007 | Jaiprakash et al. |
| 7,274,078 B2 | 9/2007 | Jaiprakash et al. |
| 7,304,357 B2 | 12/2007 | Jaiprakash et al. |

(Continued)

FOREIGN PATENT DOCUMENTS

| | | |
|---|---|---|
| CN | 101412592 A | 4/2009 |
| CN | 101413209 A | 4/2009 |

(Continued)

OTHER PUBLICATIONS

Drescher, P. et al.; "Strengthening Fibre/Matrix Interphase by Fibre Surface Modification and Nanoparticle Incorporation into the Matrix;" Composites Science and technology; 2013; vol. 74; pp. 60-66.

(Continued)

*Primary Examiner* — Dah-Wei D. Yuan
*Assistant Examiner* — Nga Leung V Law
(74) *Attorney, Agent, or Firm* — Armstrong Teasdale LLP

(57) ABSTRACT

The present disclosure is directed to methods for altering the surface of carbon fibers by growing carbon nanotubes thereon. Coverage of the carbon fibers by carbon nanotubes provides increased surface area and aspect ratio, as well as provides high electrical and thermal conductivity. In some embodiments, the surface of the carbon fibers are further modified via argon-ion bombardment or plasma treatment to provide controllable defects and to allow for easier growth of carbon nanotubes on the surface of the carbon fibers.

17 Claims, 4 Drawing Sheets

(56) References Cited

U.S. PATENT DOCUMENTS

| | | |
|---|---|---|
| 7,306,828 B2 | 12/2007 | Barrera et al. |
| 7,375,366 B2 | 5/2008 | Ohki et al. |
| 7,566,478 B2 | 7/2009 | Ward et al. |
| 7,619,291 B2 | 11/2009 | Jaiprakash et al. |
| 7,632,379 B2 | 12/2009 | Goto et al. |
| 7,719,067 B2 | 5/2010 | Jaiprakash et al. |
| 7,749,478 B2 | 7/2010 | Konesky |
| 8,034,218 B2 | 10/2011 | Dijon et al. |
| 8,057,901 B2 | 11/2011 | Ford et al. |
| 8,236,626 B2 | 8/2012 | Dai et al. |
| 8,545,790 B2 | 10/2013 | Konesky |
| 8,553,843 B2 | 10/2013 | Drory |
| 2003/0021966 A1 | 1/2003 | Segal et al. |
| 2003/0198812 A1 | 10/2003 | Rueckes et al. |
| 2004/0009115 A1 | 1/2004 | Wee et al. |
| 2004/0029706 A1 | 2/2004 | Barrera et al. |
| 2004/0175856 A1 | 9/2004 | Jaiprakash et al. |
| 2004/0181630 A1 | 9/2004 | Jaiprakash et al. |
| 2004/0253374 A1 | 12/2004 | Jung et al. |
| 2005/0202173 A1 | 9/2005 | Mills |
| 2005/0233263 A1 | 10/2005 | Park et al. |
| 2006/0052865 A1 | 3/2006 | Banas |
| 2006/0128049 A1 | 6/2006 | Jaiprakash et al. |
| 2006/0275956 A1 | 12/2006 | Konesky |
| 2007/0018260 A1 | 1/2007 | Jaiprakash et al. |
| 2007/0114120 A1 | 5/2007 | Konesky |
| 2007/0228317 A1 | 10/2007 | Barrera et al. |
| 2007/0235826 A1 | 10/2007 | Jaiprakash et al. |
| 2008/0089829 A1 | 4/2008 | Ramanath et al. |
| 2008/0093211 A1 | 4/2008 | Ramanath et al. |
| 2008/0181839 A1 | 7/2008 | Arendt et al. |
| 2008/0299307 A1 | 12/2008 | Ward et al. |
| 2009/0045473 A1 | 2/2009 | Jaiprakash et al. |
| 2009/0166523 A1 | 7/2009 | Bachmann et al. |
| 2009/0283745 A1 | 11/2009 | Ward et al. |
| 2010/0012927 A1 | 1/2010 | Jaiprakash et al. |
| 2010/0178825 A1* | 7/2010 | Shah .......... D02G 3/16 442/188 |
| 2010/0209704 A1 | 8/2010 | Yamazaki et al. |
| 2010/0261343 A1 | 10/2010 | Mizukoshi et al. |
| 2010/0284896 A1 | 11/2010 | Arendt et al. |
| 2011/0003109 A1* | 1/2011 | Slinker ........ B82B 3/00 428/92 |
| 2011/0091510 A1 | 4/2011 | Lele et al. |
| 2011/0186775 A1* | 8/2011 | Shah .......... C08L 25/02 252/182.32 |
| 2012/0027681 A1 | 2/2012 | Jung et al. |
| 2015/0147525 A1* | 5/2015 | Maruyama ...... C01B 31/0226 428/141 |

FOREIGN PATENT DOCUMENTS

| | | |
|---|---|---|
| CN | 101413210 A | 4/2009 |
| CN | 101428789 A | 5/2009 |
| CN | 102257591 A | 11/2011 |
| CN | 103031724 A | 4/2013 |
| CN | 103265712 A | 8/2013 |
| CN | 103321034 A | 9/2013 |
| GB | 2384008 B | 7/2005 |
| JP | 2005001980 A | 1/2005 |
| JP | 2007186363 A | 7/2007 |
| JP | 2010163331 A | 7/2010 |
| JP | 2010198970 A | 9/2010 |
| JP | 2013147367 A | 8/2013 |
| KR | 1020040091951 | 11/2001 |
| KR | 1020040093542 | 11/2004 |
| RU | 2228900 C1 | 5/2004 |
| WO | 0159172 A1 | 8/2001 |
| WO | 0162665 A1 | 8/2001 |
| WO | 03093173 A2 | 11/2003 |
| WO | 03106030 A1 | 12/2003 |
| WO | 2004107825 A1 | 12/2004 |
| WO | 2006029375 A2 | 3/2006 |
| WO | 2008136817 A2 | 11/2008 |
| WO | 2013158157 A1 | 10/2013 |
| WO | WO 2014120162 A1 * | 8/2014 ............ B82Y 30/00 |

OTHER PUBLICATIONS

Park, Joung-Man et al.; "Optimum Dispersion Conditions and Interfacial Modification of Carbon Fiber and CNT-Phenolic Composites by Atmospheric Pressure Plasma Treatment;"2012; Composites: Part B; vol. 43; pp. 2272-2278.

Chirila, V. et al.; Effect of the Oxygen Plasma Treatment Parameters on the Carbon Nanotubes Surface Properties; Science Direct, Surface & Coatings Technology 200; 2005; pp. 548-552.

Nakamura, R. et al.; "Effect of Halloysite Nanotube Incorporation in Epoxy Resin and Carbon Fiber Ethylene/Ammonia Plasma Treatment on their Interfacial Property;" Journal of Adhesion Science and Technology; 2012; vol. 26; pp. 1295-1312.

Osvath, Z. et al.; STM Investigation of Irradiated Carbon Nanotubes; AIP Conference Proceedings; Mar. 6-13, 2004; Tirol, Kirchberg Austria; pp. 149-152.

Bhuyan, H. et al.; "Production of Sub-Micron Size Carbon Composites by High Energy Carbon Ion Beams Irradiation of Solid Targets;" Surface & Coatings Technology 204; 2010; pp. 2950-2953.

Chen, I-Han et al.; "Preparation of Carbon Nanotube (CNT) Composites by Polymer Functionalized CNT Under Plasma Treatment;" Plasma Processes and Polymers; 2010; vol. 7, pp. 59-63.

Lesiak, B. et al.; Ar Ion Bombardment Modification of Pd—Au/MWCNTs Catalyst Surfaces Studied by Electron Spectroscopy; Physica Status Solidi A 208; 2011; No. 8, pp. 1791-1785.

Yeo, Sanghak et al.; "Sensitivity Enhancement of Carbon Nanotube Based Ammonium Ion Sensors Through Surface Modification by Using Oxygen Plasma Treatment;" Applied Physics Letter 102, 2013; 4 pp.

Chen, Guohai et al.; "An Increase in the Field Emission from Vertically Aligned Multiwalled Carbon Nanotubes Causes by NH3 Plasma Treatment;" Carbon 52; 2013; pp. 468-475.

Maity, Supratim et al.; "Controlled Surface Damage of Amorphous and Crystalline Carbon Nanotubes for Enhanced Field Emission;" Physica Status Solidi B; 2013; No. 9, pp. 1919-1925.

Wang, Zhenxia et al.; "Synthesis of Carbon Nanostructures by Ion Sputtering;" Physics Letters A 242; 1998; pp. 261-265.

Wang, Z. et al.; "Sputtered-Atom Assembly of Carbon Nanostructures During Ion Bombardment;" Applied Physics A Materials Science & Processing 71; 2000; pp. 353-355.

Brzhezinskaya, M.M. et al.; "Pi-Plasmons in Ion-Irradiated Multiwall Carbon Nanotubes;" Physica B 348; 2004; pp. 35-100.

Hunt, Charles E. et al.; "Carbon Nanotube Growth for Field-Emission Cathodes from Graphite Paste Using Ar-ion Bombardment:" Applied Physics Letter 86; 2005; 3 pp.

Wang, Zhipeng et al.; "Formation of Carbon Nanostructures Containing Single-Crystalline Cobalt Carbides by Ion Irradiation Method;" Applied Surface Science 257; 2011; pp. 3168-3173.

Osvath, Z. et al; "Scanning Tunneling Microscopy Investigation of Atomic-Scale Carbon Nanotube Defects Produced by Ar Ion Irradiation;" Materials Science and Engineering C 26; 2006; pp. 1194-1197.

Valentini, Luca et al.; "Modification of Fluorinated Single-Walled Carbon Nanotubes with Aminosilane Molecules;" Carbon 44; 2006; pp. 2196-2201.

Kitazawa, Masashi et al.; Mechanical Properties of Single Carbon Nanofibers Grown on Tips of Scanning Probe Microscopy Cantilevers by Ion Irradiation; Japanese Journal of Applied Physics; vol. 46, No. 9B; pp. 6324-6328.

Yook, Ju Young et al.; Amino Functionalization of Carbon Nanotube Surfaces with NH3 Plasma Treatment; Applied Surface Science 256; 2010; pp. 6941-6944.

Lobo, Anderson Oliveira et al.; "Fast Functionalization of Vertically Aligned Multiwalled Carbon Nanotubes Using Oxygen Plasma;" Materials Letters 70; 2012; pp. 89-93.

* cited by examiner

ALTERATION OF CARBON FIBER SURFACE PROPERTIES VIA GROWING OF CARBON NANOTUBES

BACKGROUND

The present disclosure relates to methods for altering the surface of carbon fibers by growing carbon nanotubes thereon. Coverage of the carbon fibers by carbon nanotubes provides increased surface area and aspect ratio, as well as provides high electrical and thermal conductivity. In some embodiments, the surface of the carbon fibers are further modified via argon-ion bombardment or plasma treatment to provide controllable defects and to allow for easier growth of carbon nanotubes on the surface of the carbon fibers.

Carbon fibers have become one of the key materials for reducing energy consumption in various areas, and particularly in aviation and automobile industries by replacing traditional metal compounds. Particularly, the carbon fibers have high specific strength, high specific modulus, good thermal expansion coefficient, low coefficient of friction, and good low temperature resistance, providing improved functioning in their end uses.

Despite significant progress in the area there are still serious obstacles for carbon fiber composites, especially the adhesion energy between carbon fiber and host matrix (e.g., polymers), which eventually determines the mechanical properties of the final product. Accordingly, a proper choice of host matrix and corresponding alteration of carbon fiber surface must be made.

Single-walled and multi-walled carbon nanotubes (CNTs) are increasingly becoming of interest for various applications in nanotechnology because of their unique structures, which gives them exceptional thermal, mechanical, and electrical properties. For example, CNT can be used in electronics, energy devices, medicine, and composite materials in order to obtain desirable physical and chemical properties.

It is believed that as CNTs possess tremendously high surface areas and aspect ratios, addition of CNTs to carbon fibers would allow for new features and functionality to the carbon fiber. More particularly, coverage of the fiber surface by high surface area and aspect ratio CNTs would allow the fiber and polymer matrix interface feasible for high adhesion energy and lead to the formation of high quality final composites.

Growth of CNTs on carbon fibers, however, is not straightforward. More particularly, carbon nanotubes typically grow only on semiconducting oxide surfaces (e.g., $SiO_2$ or $Al_2O_3$). Carbon fibers, however, have a highly graphitized surface, and thus, it is difficult to grow carbon nanotubes on the fiber surfaces using the traditional chemical vapor deposition method.

Accordingly, there is a need in the art for methods of modifying the fiber surface to achieve improved growth of carbon nanotubes on the carbon fiber surface.

BRIEF SUMMARY

It has been found that the surface of the carbon substrates, such as carbon fibers, can be preliminarily treated by introducing proper defects (e.g., holes and/or "craters" on an atomic scale) on the substrate surface to allow for enhanced growth of carbon nanotubes thereon. Particularly, Ar-ion bombardment and/or plasma treatment of the substrate surface allows for the introduction of defects and alteration of the carbon substrate surface, enabling the surface to support higher density of catalyst nanoparticles, and thereby allowing for easier growth of carbon nanotubes. This further allows for an increased surface area of the carbon substrates and thereby makes the adhesion between the carbon substrate and polymer matrix of composites stronger. In some embodiments, the carbon nanotube surfaces can be further functionalized for various matrices to make adhesion even stronger.

Accordingly, in one aspect, the present disclosure is directed to methods for modifying a carbon substrate. The method comprises: providing a carbon substrate; modifying the surface of the carbon substrate; and growing carbon nanotubes on the modified surface of the carbon substrate. In one embodiment, the carbon substrate surface is modified using ion bombardment. In another embodiment, the carbon substrate surface is modified using plasma treatment.

In one aspect, carbon nanotubes are prepared by: contacting liquid catalyst droplets, or a solid catalyst, and a carbon source in a chemical vapor deposition reactor; and forming a carbon nanotube at the surface of the liquid catalyst droplet on the modified surface of the carbon substrate. In another aspect, carbon nanotubes are prepared by: coating the modified carbon substrate with liquid catalyst droplets; contacting the coated modified carbon substrate with a carbon source; and forming a carbon nanotube at the surface of the liquid catalyst droplet on the coated modified surface of the carbon substrate.

The features, functions, and advantages described herein may be achieved independently in various embodiments of the present disclosure or may be combined in yet other embodiments, further details of which may be seen with reference to the following description and drawings.

Figure 1A:
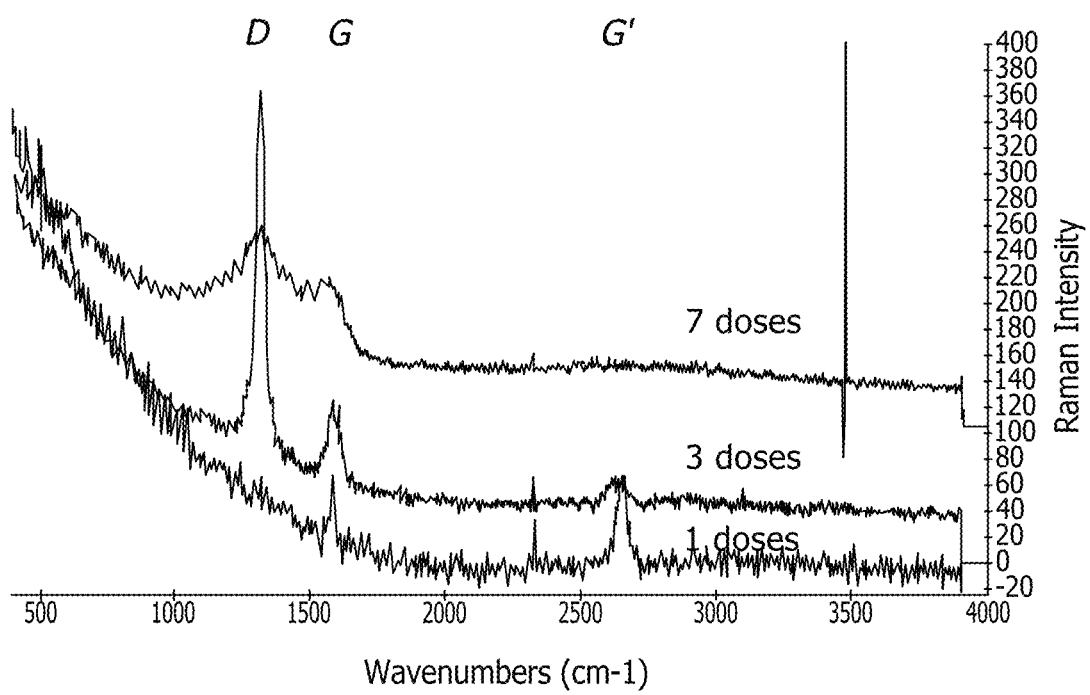
FIGS. 1A & 1B depict the effect of increasing ion bombardment dosing on the catalyst particle density.

Although specific features of various implementations may be shown in some drawings and not in others, this is for convenience only. Any feature of any drawing may be referenced and/or claimed in combination with any feature of any other drawing.

DETAILED DESCRIPTION

The subject matter described herein relates generally to methods for altering the surface of a carbon substrate by growing carbon nanotubes thereon. Coverage of the carbon substrate by carbon nanotubes provides increased surface area and aspect ratio, as well as provides high electrical and thermal conductivity. In some embodiments, the surface of the carbon substrate is further modified via argon-ion bombardment or plasma treatment to provide controllable defects and to allow for easier growth of carbon nanotubes on the surface of the substrate. Particularly, it has been found that the catalyst material for use in growing the carbon nanotubes as described above is attracted to the defects on the surface of the carbon substrate, thereby keeping the catalyst, and ultimately, the formed carbon nanotube, on the surface of the substrate.

The methods of the present disclosure further provide for carbon substrates with modified surfaces such to improve the adhesion between the carbon substrates and host matrix (e.g., polymer) to which the carbon substrates bind in end composite products such as for use in the aviation and automobile industries.

Generally, the methods of the present disclosure for modifying a carbon substrate include: providing a carbon substrate; modifying the surface of the carbon substrate such as by ion bombardment or plasma treatment; and growing carbon nanotubes on the modified surface of the carbon substrate. Suitable carbon substrates include carbon fibers, graphite, graphene, graphite oxide, diamond, and combinations thereof. In a particularly suitable embodiment, the carbon substrate is carbon fiber. As used herein, "carbon fiber" refers to a fiber material subjected to high-temperature carbonization with the carbon content being higher than 85%, which includes carbon fiber and graphite fiber. The carbon fiber is formed of organic fiber subjected to treatment of 1000-2300° C., with a carbon content of 85-95%; and the graphite fiber is formed of organic fiber subjected to treatment at a temperature higher than 2300° C., the carbon content of which his higher than 98%.

It has been shown that the bonding strength of the carbon substrate to other materials (e.g., host polymer matrix) can be enhanced by modification of the substrate's surface. Surface modification for improving adhesion between the carbon substrate and host matrix and enhancing the interlaminar shearing strength of the end composite product includes increasing polar groups such as carboxyl groups, carbonyl groups and ester groups of the carbon substrate and increases the surface area, thus improving permeability and adhesion between the carbon substrate and host matrix.

The surface of the carbon substrate can be modified by ion bombardment or plasma treatment. Ion bombardment can be used as known in the art with any suitable noble gas. For example, an argon ion beam can be furnished by an electron bombardment ion source of the type developed for electric propulsion technology. Argon gas from a suitable source as known in the art is fed through a line to a cathode in a chamber within the source where the gas is ionized. The argon ions are retained within this chamber which also contains an anode about its outer periphery. Such an ion source is described in "Advances in Electronic and Electron Physics" by H. R. Kaufman, vol. 36, pages 265-373 (1974). It will be appreciated that other noble gases, in addition to argon can be used to form the bombarding ions in the beam. For example, helium and xenon may be used. In other embodiments, hydrogen, and even hydrocarbons, may be provided in the ion source.

Figure 1B:
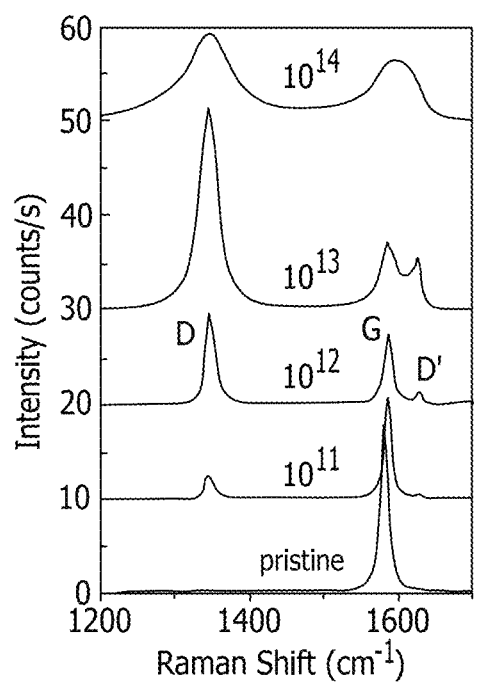

When ions hit the carbon substrate surface, they penetrate it, knocking away nearby atoms and creating defects or holes in the surface of the carbon substrate. These defects attract the catalyst particles as described below for growing the carbon nanotubes on the surface of the carbon substrate. It has been found that dosage of ion bombardment allows for tailoring of the catalyst particle density. More particularly, by increasing the ion bombardment dosing, an increase in catalyst particle density is provided to allow for the production of vertically aligned nanotubes/forests (see FIGS. 1A & 1B).

In another embodiment, the surface of the carbon substrate is modified using plasma treatment. The plasma treatment is typically performed in a commercial plasma-CVD system (such as available from Aixtron Black Magic, Aixtron SE, Germany). The carbon substrate is loaded into the chamber of the system, pumped down to below 0.2 Torr in pressure, followed by introduction of argon gas and increasing the system pressure to 10 Torr. The plasma is then turned on at from about 10 V to about 50 V for durations ranging from about 1 to about 10 minutes.

While described herein as a chemical vapor deposition (CVD) system, it should be understood by one skilled in the art that the plasma treatment of the surface can be via any plasma treatment device known in the art, including for example, a dielectric barrier discharged plasma source, a surface discharge plasma source, a gas discharge plasma source, a plasma torch source, an arc plasma torch, a gliding arc plasma torch, a cold plasma torch, a DC plasma source, a pulse plasma source, a magnetron plasma source, an inductively coupled plasma source, a helical tube plasma source, a helical resonator plasma source, a microwave plasma source, an atmospheric-pressure plasma jet source, a corona discharge plasma source, a microplasma source, a low-pressure plasma source, and a high-pressure plasma source.

Once modified through ion bombardment and/or plasma treatment, the modified surface of the carbon substrate is further modified by growing carbon nanotubes thereon. Carbon nanotubes are allotropes of carbon, typically with a substantially cylindrical nanostructure. Carbon nanotubes are categorized as single-walled nanotubes (SWNT) and multi-walled nanotubes (MWNT). SWNT have a single layer of carbon comprising its microstructure while MWNT are comprised of several layers.

Catalysts used in the methods of the present disclosure are particularly suitable to initiate and increase the rate of chemical reactions which produce MWNT. More specifically, the catalysts of the present disclosure interact with a carbon source, further described below, to form MWNT. The catalysts serve as the formation surface for MWNT. Any catalysts and catalyst mixtures having a melting point lower than the MWNT synthesis temperature may be used in the present disclosure. More specifically, the catalysts described herein may include materials including iron, nickel, cobalt, copper, chromium, indium, gallium, platinum, manganese, cerium, europium, ytterbium, silver, gold, zinc, cadmium, and lanthanum, any other catalysts known in the art, and compounds and combinations thereof. In particularly suitable embodiments, the catalysts include indium, gallium, and combinations thereof.

The catalysts used in the methods of the present disclosure may be prepared in many different forms. Non-limiting examples include a catalyst precursor material that is formed as a solid catalyst particle, a catalyst precursor material that is formed as a solid that is dispersed in a liquid, or a catalyst precursor material that is dissolved in a solvent. In an illustrative example, the catalyst precursor material is formed in a colloidal solid catalyst particle. The colloidal solid catalyst particle may be dispersed in a liquid. In a non-limiting example, the liquid may be an organic solvent.

Catalysts used in the methods of the present disclosure, described more fully above, are configured to form liquid catalyst droplets that provide surfaces for the growth of MWNT during catalytic decomposition of a carbon source. The carbon source used in the methods of the present disclosure include elemental carbon and any carbon containing source capable of providing elemental carbon for the formation of MWNT. In general, any carbon containing gas that does not pyrolize at temperatures up to 500° C. to 1000° C. can be used. Non-limiting examples include carbon monoxide, aliphatic hydrocarbons, both saturated and unsaturated, such as methane, ethane, propane, butane, pentane, hexane, acetylene, ethylene, and propylene; oxygenated hydrocarbons such as acetone, methanol, and ethanol; aromatic hydrocarbons such as benzene, toluene, xylene and naphthalene; and mixtures of the above, for example carbon monoxide and methane. The carbon source may optionally be mixed with a diluent gas such as hydrogen, helium, argon, neon, krypton and xenon or a mixture thereof.

In some embodiments of the present disclosure, the reactants used in the chemical process of forming MWNT include a carrier gas In methods of the present disclosure, the carrier gas is typically a gas used as a mass transport mechanism but may also be used to dilute the reactants or slow the reaction rate. The carrier gas used in methods of the present disclosure may include one or more inert gases (e.g., nitrogen, helium, neon, argon, etc.) or any other gas suitable for improving the formation of MWNT as known in the art.

The liquid catalyst droplets and carbon source are generally contacted to form the carbon nanotubes in any type of reactor known in the nanotube formation art. Generally, carbon nanotubes are formed by a number of different chemical processes including pyrolysis and chemical vapor deposition (CVD) in a number of different types of reactors. Such reactors are suitable for methods of the present disclosure.

Figure 2:
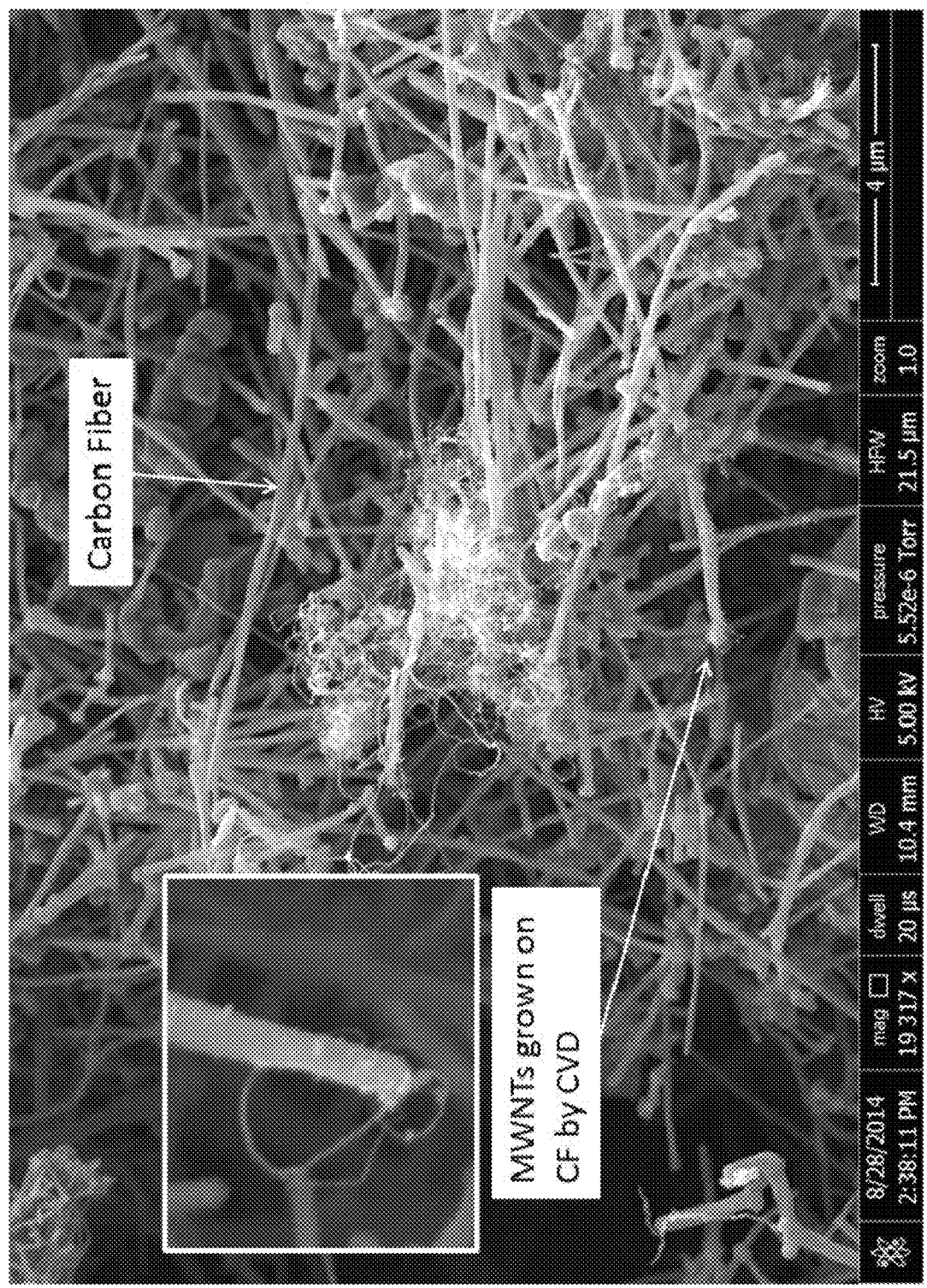
FIG. 2 shows multi-walled carbon nanotubes grown on the surface of carbon fibers using chemical vapor deposition according to one embodiment of the present disclosure.

In one embodiment, the liquid catalyst droplets and carbon source are injected with a syringe into a CVD reactor at a temperature of from about 700° C. to about 800° C. The catalyst droplets break up into atoms/clusters within the reactor that then condense and are spray deposited onto the surface of the modified carbon substrate (e.g., carbon fiber) described above (see FIG. 2). In another embodiment, the liquid catalyst droplets are coated, such as by being sprayed or dip coated, onto the surface of the modified carbon substrate and then contacted with the carbon source.

Once contacted with the modified carbon substrate, carbon nanotubes grow on the surface of the substrate at the interface of the substrate and catalyst. Typically, the catalyst is contained within the defects of the modified carbon substrate, preventing the catalyst, and final carbon nanotubes, from migrating along the surface of the carbon substrate.

Optional size selection methods can be used to separate out a catalyst material with a desired particle size distribution prior to the growth of nanotubes on the liquid catalyst droplets. In a non-limiting example, the size selection can be performed by using a cylindrical differential mobility analyzer (DMA) and an ultrafine condensation particle counter. For instance, the particle size and distribution could be determined by on-line aerosol size classification using the DMA and the ultrafine condensation particle counter as described in Lenggoro et al., "Sizing of Colloidal Nanoparticles by Electrospray and Differential Mobility Analyzer Methods," Langmuir, 2002, 18, 4584-4591, which is hereby incorporated by reference to the extent it is consistent herewith. The DMA allows for the isolation of catalyst particles that fall within a desired range of electrical mobility from a steady stream of charged particles suspended in a gas. The narrow range of electrical mobilities in the aerosol that is classified by the DMA directly translates to a narrow range of particle size. Such controlled particle size distribution provides for a more homogenous growth environment, and the resulting nanotube product.

Growing of the carbon nanotubes is typically at a synthesis temperature that is above the melting point of the catalyst particles so that the catalyst is maintained in the form of liquid catalyst droplets. It is to be understood that any form of heating may be provided to maintain the growing at the desired synthesis temperature. To facilitate MWNT growth, growing may comprise optimal temperature and/or pressure conditions. In a non-limiting example, the growing is at a temperature of from about 500° C. to about 1300° C., particularly from about 700° C. to about 800° C.

Once carbon nanotubes are grown on the surface of the carbon substrates, the carbon substrates can be with a host matrix to form a final composite product. In one non-limiting example, the host matrix is a polymer matrix.

Figure 3:
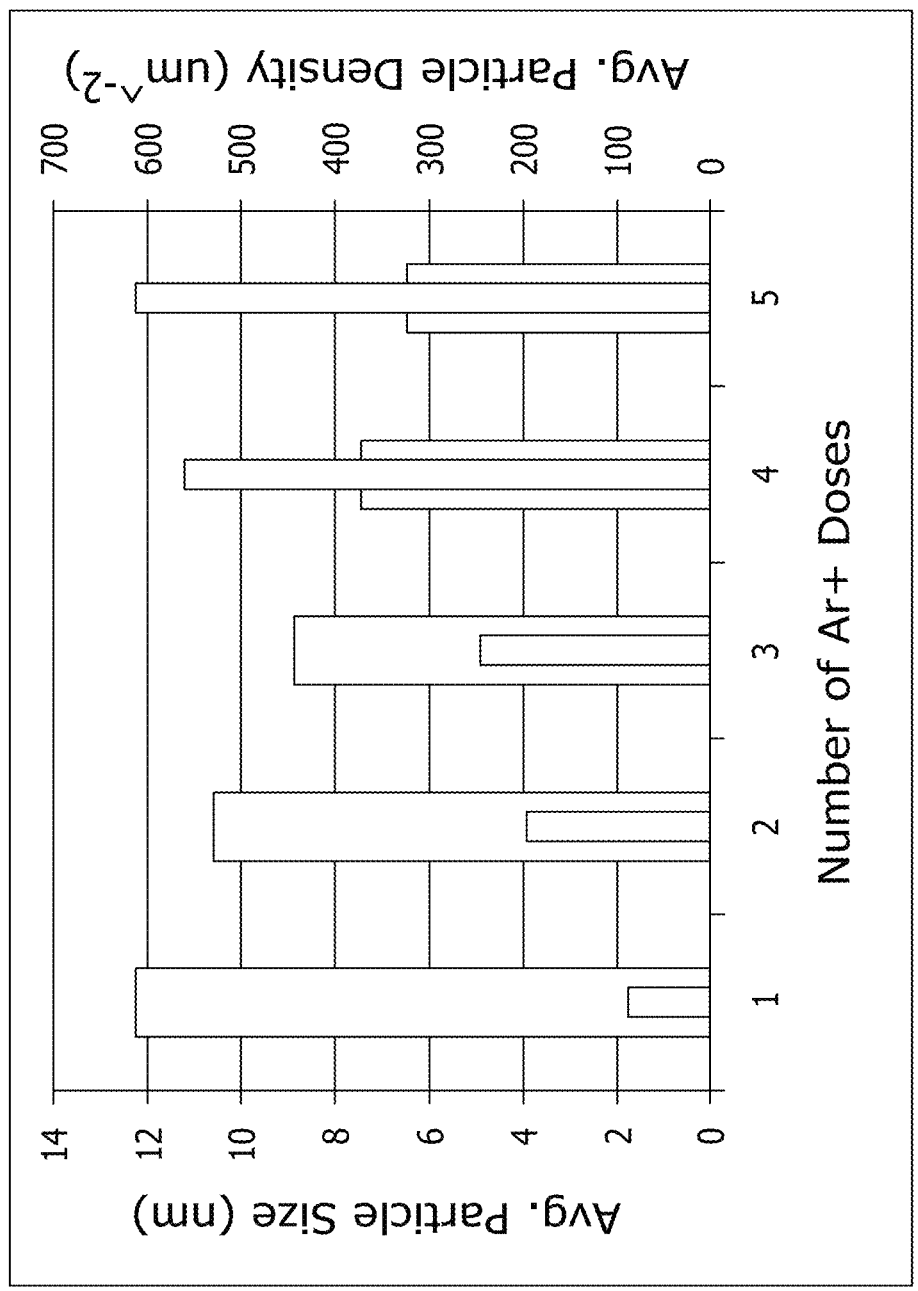
FIG. 3 is a graphical illustration of the effect of one or more doses of argon ion bombardment on graphene on average particle size and average particle density.
Figure 4:
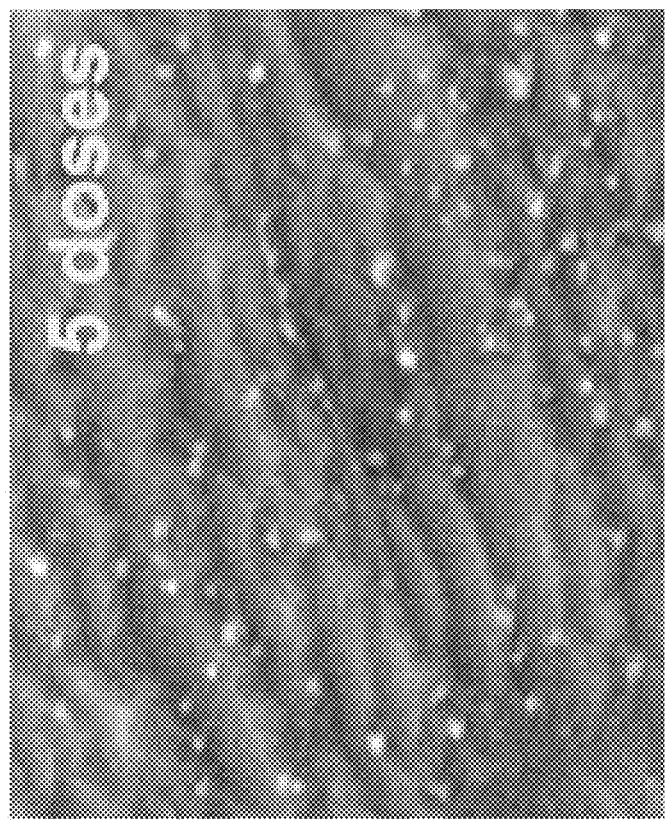
FIG. 4 shows a side-by-side comparison of graphene that has undergone a one dose and a five dose argon ion bombardment.
Figure 4:
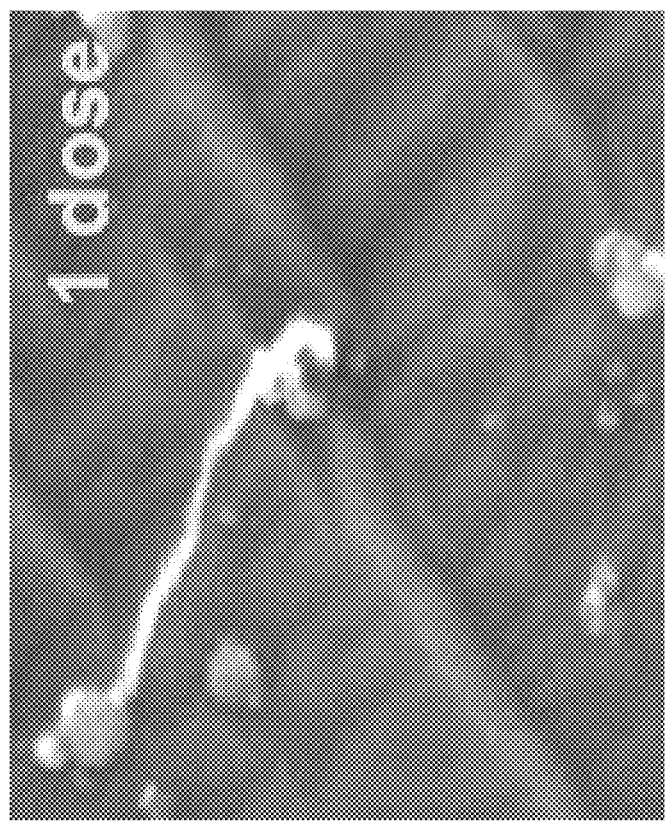

FIG. 3 is a graphical illustration of the effect of one or more doses of argon ion bombardment on graphene on average particle size and average particle density. As described above, increasing ion bombardment dosing generally results in an increase in catalyst particle density. For example, a five dose bombardment results in an increase in the average particle density by a factor of about six when compared to a one dose bombardment. Conversely, increasing ion bombardment dosing generally results in a decrease in average particle size. For example, a one dose bombardment results in a decrease in the average particle size from about 12 nm to about 6 nm for a five dose bombardment. As such, decreasing the average particle size enables smaller diameter nanotubes to be grown on the substrate.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art.

What is claimed is:

1. A method for modifying a carbon fiber, the method comprising:
   providing a carbon fiber;
   modifying a surface of the carbon fiber by forming a plurality of defects on the surface of the carbon fiber, wherein the plurality of defects are formed using at least one of ion bombardment and a plasma treatment with a power of from about 10 to about 50 V;
   depositing a catalyst directly on the modified surface of the carbon fiber;
   contacting the carbon fiber with a carbon source; and
   growing carbon nanotubes on the modified surface of the carbon fiber.

2. The method as set forth in claim 1 wherein modifying the surface of the carbon fiber comprises noble gas ion bombardment.

3. The method as set forth in claim 2 wherein the ion bombardment comprises argon ions, helium ions, xenon ions, and combinations thereof.

4. The method as set forth in claim 1 wherein modifying the surface of the carbon fiber comprises using the plasma treatment for a period of from about 1 to about 10 minutes.

5. The method as set forth in claim 1 wherein growing carbon nanotubes on the modified surface of the carbon fiber comprises:
   contacting liquid catalyst droplets on the modified surface of the carbon fiber and a carbon source in a chemical vapor deposition reactor; and
   forming the carbon nanotubes at the surfaces of the liquid catalyst droplets on the modified surface of the carbon fiber.

6. The method as set forth in claim 5 further comprising dissolving a catalyst particle in an organic solvent to form the liquid catalyst droplets.

7. The method as set forth in claim 6 wherein the catalyst particle comprises a material selected from the group consisting of iron, nickel, cobalt, copper, chromium, indium, gallium, platinum, manganese, cerium, europium, ytterbium, silver, gold, zinc, cadmium, lanthanum, and combinations thereof.

8. The method as set forth in claim 5 wherein the carbon source is a material selected from the group consisting of carbon monoxide, aliphatic hydrocarbons, oxygenated hydrocarbons, aromatic hydrocarbons, and mixtures thereof.

9. The method as set forth in claim 5 wherein contacting liquid catalyst droplets and the carbon source further comprises contacting the liquid catalyst droplets and carbon source with a diluent gas.

10. The method as set forth in claim 9 wherein the diluent gas is selected from the group consisting of hydrogen, helium, argon, neon, krypton and xenon and mixtures thereof.

11. The method as set forth in claim 1 wherein growing carbon nanotubes on the modified surface of the carbon fiber comprises:
    coating the modified carbon fiber with liquid catalyst droplets; and
    contacting the coated modified carbon fiber with a carbon source; and
    forming the carbon nanotubes at the surfaces of the liquid catalyst droplets on the coated modified surface of the carbon fiber.

12. The method as set forth in claim 11 further comprising dissolving a catalyst particle in an organic solvent to form the liquid catalyst droplets.

13. The method as set forth in claim 12 wherein the catalyst particle comprises a material selected from the group consisting of iron, nickel, cobalt, copper, chromium, indium, gallium, platinum, manganese, cerium, europium, ytterbium, silver, gold, zinc, cadmium, lanthanum, and combinations thereof.

14. The method as set forth in claim 11 wherein the carbon source is a material selected from the group consisting of carbon monoxide, aliphatic hydrocarbons, oxygenated hydrocarbons, aromatic hydrocarbons, and mixtures thereof.

15. The method as set forth in claim 11 wherein contacting the coated modified carbon fiber with the carbon source further comprises contacting the coated modified carbon fiber and carbon source with a diluent gas.

16. The method as set forth in claim 15 wherein the diluent gas is selected from the group consisting of hydrogen, helium, argon, neon, krypton and xenon and mixtures thereof.

17. The method as set forth in claim 1 further comprising providing the carbon fiber containing the carbon nanotubes in a polymer matrix.

* * * * *